(12) United States Patent  (10) Patent No.: US 8,933,680 B2
Bemat et al.  (45) Date of Patent: Jan. 13, 2015

(54) OUTPUT INDUCTOR VOLTAGE REGULATION

(75) Inventors: Mohamed Amin Bemat, Houston, TX (US); Daniel Humphrey, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 845 days.

(21) Appl. No.: 13/178,829

(22) Filed: Jul. 8, 2011

(65) Prior Publication Data

US 2013/0010511 A1 Jan. 10, 2013

(51) Int. Cl.
*H02M 3/156* (2006.01)

(52) U.S. Cl.
USPC .......................................... 323/290; 323/284

(58) Field of Classification Search
USPC .......................... 323/222, 271, 282, 284, 351; 363/81–90
See application file for complete search history.

(56) References Cited

U.S. PATENT DOCUMENTS

| 6,356,462 | B1 | 3/2002 | Jang et al. | |
| 6,411,534 | B1 | 6/2002 | Kurnia et al. | |
| 6,529,354 | B1 | 3/2003 | Shteynberg et al. | |
| 6,738,266 | B2* | 5/2004 | Hosotani et al. | 363/16 |
| 6,822,646 | B2* | 11/2004 | Kang | 345/212 |
| 6,903,536 | B2 | 6/2005 | Yang | |
| 6,912,143 | B2* | 6/2005 | Gan et al. | 363/89 |
| 8,295,068 | B2* | 10/2012 | Lai et al. | 363/98 |

OTHER PUBLICATIONS

Hwu, et al.: "*Improvement in Efficiency of the Phase-Shift Current-Doubler-Rectification ZVS Full-Bridge DC-DC Converter*"; http://ieeexplore.ieee.org/xpl/freeabs_all.jsp?arnumber=4195839 ; publication date Feb. 25, 2007-Mar. 1, 2007; pp. 991-997.

* cited by examiner

*Primary Examiner* — Jessica Han

(57) ABSTRACT

A power supply system and method are disclosed. The system includes a switching stage to provide an output current through an output inductor in response to a switching signal having a substantially fixed duty-cycle. The system also includes a load monitor to monitor a load of the power supply system. The system further includes a gate drive controller to generate the switching signal and to change operation of the switching stage from a normal operating mode to a light-load operating mode in response to the load being less than a predetermined threshold to substantially minimize a voltage across the output inductor in the light-load operating mode.

20 Claims, 2 Drawing Sheets

OUTPUT INDUCTOR VOLTAGE REGULATION

BACKGROUND

Power converters, such as direct current to direct current (DC/DC) power converters are implemented in a variety of electronic devices to convert an input DC voltage to an output DC voltage. There are various types of DC/DC power converters, such as buck, boost, or buck/boost switching converters. Power supply systems often implement an output inductor through which an output current is provided to generate an output voltage. The magnitude of the voltage across the output inductor can affect the output voltage based on the amount of the load to which the power supply system provides the output power.

DETAILED DESCRIPTION

Figure 1:
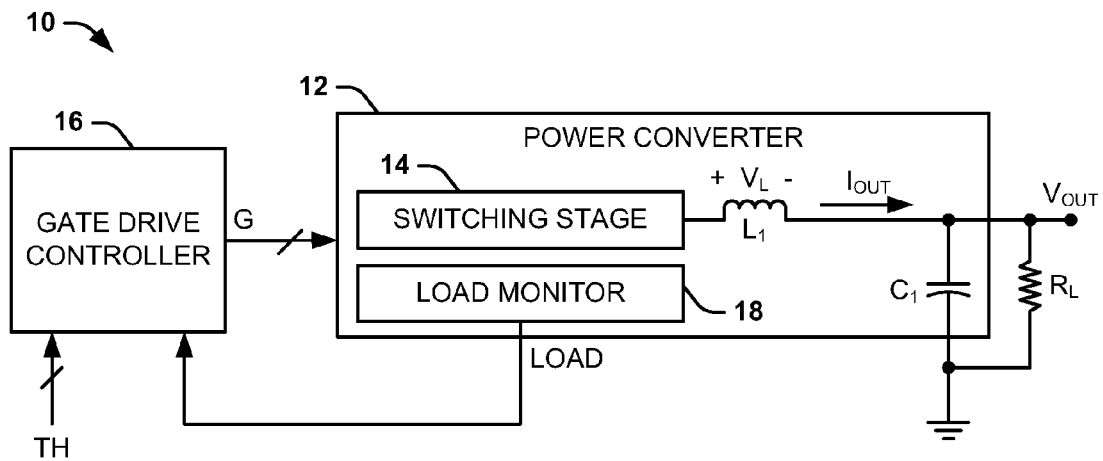
FIG. 1 illustrates an example of a power supply system.

FIG. 1 illustrates an example of a power supply system 10. The power supply system 10 can be configured to provide an output voltage $V_{OUT}$ to any of a variety of electronic components. The output voltage $V_{OUT}$ can be generated across an output capacitor $C_1$ based on the flow of an output current $I_{OUT}$ through an output inductor $L_1$. Thus, the output voltage $V_{OUT}$ can provide power to a load $R_L$. In the example of FIG. 1 and as described herein, the power supply system 10 is demonstrated as a direct current to direct current (DC/DC) power supply. For example, the power supply system 10 can be implemented in any of a variety of handheld electronic devices, such as a wireless communications device or portable computing device. As an example, the power supply system 10 can operate in open-loop configuration with respect to the output voltage $V_{OUT}$, such that the power supply system 10 can operate substantially more efficiently than a typical closed-loop DC/DC converter. However, it is to be understood that other control schemes can be implemented for generation of the output voltage $V_{OUT}$, such as independent of the inductor voltage control schemes described herein.

The power supply system 10 includes a power converter 12. The power converter 12 can be configured as any of a variety of power converter types, such as a buck converter, a boost converter, a buck/boost converter, or a resonant power converter. The power converter 12 can generate the output voltage $V_{OUT}$ in response to activation of one or more power switches in a switching stage 14 via a respective one or more switching signals, demonstrated in the example of FIG. 1 as a signal G. As an example, the switching stage 14 can include one or more switches, such as metal-oxide semiconductor field effect transistors (MOSFETs) that couple an input voltage (not shown) to the output inductor $L_1$ through which the output current $I_{OUT}$ flows. As another example, the switching stage 14 can include a set of switches that are configured as an output rectifier that interconnect the output inductor $L_1$ and a secondary winding of a transformer, such that the set of switches of the switching stage 14 are alternately activated to direct the current through the output inductor $L_1$.

In the example of FIG. 1, the switching signals G are generated by a gate drive controller 16. The gate drive controller 16 can generate the switching signals G at a duty-cycle that determines the activation of the switches in the switching stage 14 during a normal operating mode. For example, the switching signals G can be generated by the gate drive controller 16 to have a substantially constant duty-cycle, such as a maximum non-overlapping duty-cycle during the normal operating mode. As a result, the power supply system 10 can operate with substantially high efficiency. As used herein, the terms "maximum duty-cycle" and "maximum non-overlapping duty-cycle" refer to a duty-cycle that has approximately equal on-times and off-times for an alternately activated one pair of switches or two pairs of switches in a manner such that at least one switch is activated at almost any given time without any activation overlap between the alternate pair or two pairs of switches. Additionally, the term "substantially constant" is used to mean that while the effect may be intended to be constant, variations can exist in an implementation or embodiment, such as due to process variations.

As described above, the output voltage $V_{OUT}$ is generated based on the flow of the output current $I_{OUT}$ through the output inductor $L_1$. Thus, the output voltage $V_{OUT}$ can be provided to power the load $R_L$. As an example, the load $R_L$ can be a variable load, such that the resistance of the load can vary for a variety of reasons during operation of the power supply system 10. As a result of the operation of the switching stage 14, a voltage $V_L$ develops across the output inductor $L_1$. During normal operating conditions, such as when the load $R_L$ is sufficiently high, the voltage $V_L$ across the output inductor $L_1$ may be irrelevant for proper operation of the power supply system 10. However, during light-load conditions, such as when the load $R_L$ decreases significantly, the output voltage $V_{OUT}$ can increase in magnitude, such as based on the magnitude of the voltage $V_L$ across the output inductor $L_1$. Such an increase in the output voltage $V_{OUT}$ can exceed specification magnitudes and, in some cases, can potentially damage the load $R_L$. Therefore, the gate drive controller 16 is configured to control the voltage $V_L$ across the output inductor $L_1$ to substantially mitigate increases in the output voltage $V_{OUT}$ during light-load conditions.

In the example of FIG. 1, the power supply system 10 also includes a load monitor 18 configured to monitor the output current $I_{OUT}$. As an example, the load monitor 18 can be configured to monitor an input current and/or the output current $I_{OUT}$, such as based on a current sense resistor or any of a variety of other load sensing electronic components. The load monitor 18 thus generates a signal LOAD (e.g., a voltage having a value) that is indicative of a magnitude of the load $R_L$. The signal LOAD is provided to the gate drive controller 16. Thus, the gate drive controller 16 is configured to compare the signal LOAD with one or more threshold signals TH corresponding to one or more respective reference loads. As a result, the gate drive controller 16 can change an operating mode of the power supply system 10 from a normal operating mode to a light-load operating mode in response to the load RL being less than a reference load. Accordingly, the gate drive controller 16 can be configured to adjust the operation of the switching stage 14 to control the voltage $V_L$ across the output inductor $L_1$, such as via the switching signals G.

As an example, the switches of the switching stage 14 can be N-channel devices that are activated by logic-high states of the switching signals G. In addition, the switching stage 14 can include a parallel-coupled diode that is associated with each switch. Therefore, in the light-load operating mode, the gate drive controller 16 can be configured to set the switching signals G to have a substantially constant off-state voltage (e.g., approximately zero volts) to deactivate the respective switches. As a result, the output current $I_{OUT}$ is forced to flow through the parallel-coupled diodes which can result in a larger voltage drop across each of the respective switches. Accordingly, the voltage $V_L$ across the output inductor $L_1$ can be decreased based on a difference between the voltage drop across the respective switch(es) when activated and when deactivated.

As an example, the switching stage 14 can be configured as a half-bridge rectifier or freewheeling rectifier, such that the output current $I_{OUT}$ flows through a single switch at a given time (e.g., in each of two separate current paths). Therefore, the gate drive controller 16 can be configured to deactivate the single switch in the light-load operating mode. As another example, the switching stage 14 can be configured as a full-bridge rectifier, such that the output current $I_{OUT}$ flows through a pair of switches at a given time (e.g., in each of two separate current paths). Thus, in the example of the switching stage 14 being configured as a full-bridge rectifier, the threshold signal(s) TH can correspond to two separate thresholds. Therefore, the gate drive controller 16 can be configured to deactivate one of the pair of switches through which the output current $I_{OUT}$ flows in response to the load monitor signal LOAD being less than one of the two thresholds TH, and can be configured to deactivate both of the pair of switches through which the output current $I_{OUT}$ flows in response to the load monitor signal LOAD being less than both of the two thresholds TH.

Figure 2:
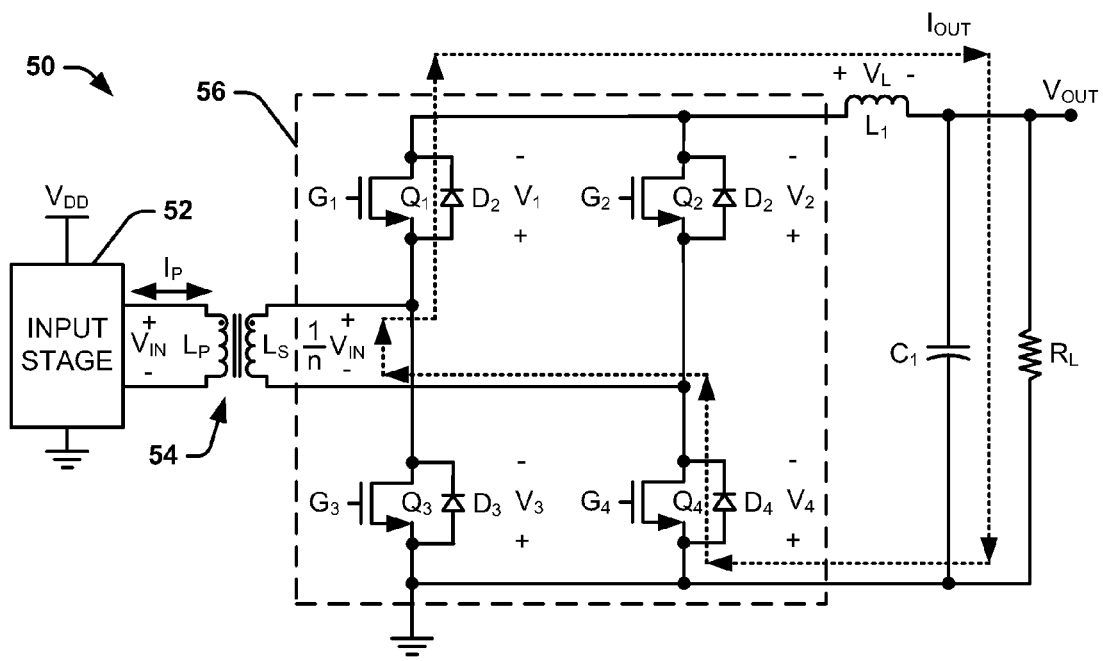
FIG. 2 illustrates an example of a power converter.

FIG. 2 illustrates an example of a power converter 50. The power converter 50 can correspond to the power converter 12 in the example of FIG. 1. Therefore, reference is to be made to the example of FIG. 1 in the example of FIG. 2.

The power converter 50 includes an input stage 52 coupled to a primary winding $L_P$ of a transformer 54. As an example, the input stage 52 can include one or more switches that are activated to generate a primary resonant current $I_P$ through the primary winding $L_P$ of the transformer 54. As a result, the primary resonant current can induce a current $I_S$ in a secondary inductor $L_S$ in the transformer 54 based on magnetic coupling in a core of the transformer 54.

The power converter 50 also includes a switching stage 56 coupled to the secondary winding $L_S$ of the transformer 54. The switching stage 56 includes two pairs of MOSFET switches, demonstrated in the example of FIG. 2 as $Q_1$ through $Q_4$, with respective parallel-coupled diodes $D_1$ through $D_4$. The switches $Q_1$ through $Q_4$ are alternately activated to rectify the output current $I_{OUT}$ that flows through the output inductor $L_1$. In the example of FIG. 2, the switches $Q_1$ through $Q_4$ are configured as N-channel MOSFETs, but it is to be understood that the switches $Q_1$ through $Q_4$ can be configured as a variety of different types of switches.

The switches $Q_1$ and $Q_4$ can be activated concurrently by respective switching signals $G_1$ and $G_4$ and the switches $Q_2$ and $Q_3$ can be activated concurrently by respective switching signals $G_2$ and $G_3$ alternately with the switches $Q_1$ and $Q_4$. For example, the switching signals $G_1$ through $G_4$ can be generated by the gate drive controller 16 in the example of FIG. 1. As an example, during the normal operating mode, the switching signals $G_1$ through $G_4$ can have a substantially fixed duty-cycle, such as a maximum duty-cycle that is non-overlapping with respect to the alternate activation of the switches $Q_1$ and $Q_4$ and the switches $Q_2$ and $Q_3$. Thus, based on the switching of the switches $Q_1$ through $Q_4$, the output current $I_{OUT}$ is provided through the output inductor $L_1$ to generate the output voltage $V_{OUT}$ across the output capacitor $C_1$ to the load $R_L$.

In the example of FIG. 2, the output current $I_{OUT}$ is demonstrated as a current loop that flows through the load $R_L$, through the switch $Q_4$, through the secondary winding $L_S$ of the transformer 54 based on the current $I_P$, through the switch $Q_1$, and through the inductor $L_1$. Thus, at the instance demonstrated in the example of FIG. 2, the switches $Q_1$ and $Q_4$ are activated via the respective switching signals $G_1$ and $G_4$ in the normal operating mode concurrently with a negative polarity of a voltage $V_{IN}$ across the primary inductor $L_P$, and thus a negative polarity of a voltage $1/n^*V_{IN}$ across the secondary inductor $L_S$, where n is a positive integer corresponding to a number of loops of the primary winding $L_P$ relative to the secondary winding $L_S$. Similarly, upon deactivation of the switches $Q_1$ and $Q_4$, the switches $Q_2$ and $Q_3$ are activated via the respective switching signals $G_2$ and $G_3$ in the normal operating mode concurrently with a positive polarity of a voltage $V_{IN}$ across the primary inductor $L_P$, and thus a positive polarity of a voltage $1/n^*V_{IN}$ across the secondary inductor $L_S$. As a result, the output current $I_{OUT}$ then forms a current loop through the load $R_L$, through the switch $Q_3$, through the secondary winding $L_S$ in the opposite direction, through the switch $Q_2$, and through the inductor $L_1$. It is to be understood that, in the example of FIG. 2, the positive and negative polarities of the voltage $V_{IN}$ and the voltage $1/n^*V_{IN}$ are with respect to a voltage $V_{DD}$ and ground of the input stage.

As the output current $I_{OUT}$ flows through the respective switches $Q_1$ through $Q_4$, voltages $V_1$ through $V_4$ develop across the respective switches $Q_1$ through $Q_4$. The voltages $V_1$ through $V_4$ can affect the magnitude of the voltage $V_L$ across the output inductor $L_1$, which for each of the respective current loops of the output current $I_{OUT}$ is defined as follows:

$$V_L = 1/n^*V_{IN} - V_{OUT} - V_1 - V_4 \quad \text{Equation 1}$$

$$V_L = 1/n^*V_{IN} - V_{OUT} - V_2 - V_3 \quad \text{Equation 2}$$

The voltage $V_L$ across the output inductor $L_1$ can control the rate at which the current flow increases to the output of the power converter 50 (i.e., the node of the output voltage $V_{OUT}$). As an example, upon occurrence of a light-load condition, the output voltage $V_{OUT}$ can increase significantly based on the magnitude of the voltage $V_L$ across the output inductor $L_1$. Such an increase can damage certain types of loads $R_L$, such as peripheral component interconnect (PCI) cards, fans, hard drives, and other types of loads $R_L$ that have a low tolerance for the output voltage $V_{OUT}$.

As described above in the example of FIG. 1, a gate drive controller (not shown in the example of FIG. 2), such as the gate drive controller 16, can be configured to adjust operation of the switching stage 56 to control the voltage $V_L$ across the output inductor $L_1$. Accordingly, the associated gate drive controller can be configured to set the switching signals $G_1$ through $G_4$ to selectively deactivate the respective switches $Q_1$ through $Q_4$ during a light-load operating mode. As a result, the output current $I_{OUT}$ can be forced to flow through the respective parallel-coupled diodes $D_1$ through $D_4$ instead of the selected switches $Q_1$ through $Q_4$. The voltages $V_1$ through $V_4$ are substantially greater when the output current $I_{OUT}$ flows through the parallel-coupled diodes $D_1$ through $D_4$ than when the output current $I_{OUT}$ flows through the activated switches $Q_1$ through $Q_4$. Therefore, an increase in one or both of the voltages $V_1$ and $V_4$ in Equation 1 or one or both of the voltages $V_2$ and $V_3$ in Equation 2 can result in a decrease in the voltage $V_L$ across the inductor $L_1$. Accordingly, in the light-load operating mode, the associated gate drive controller can be configured to selectively deactivate the switches $Q_1$ through $Q_4$ to substantially mitigate the voltage $V_L$ across the output inductor $L_1$, thus mitigating an increase in the output voltage $V_{OUT}$ during a light-load condition.

Figure 3:
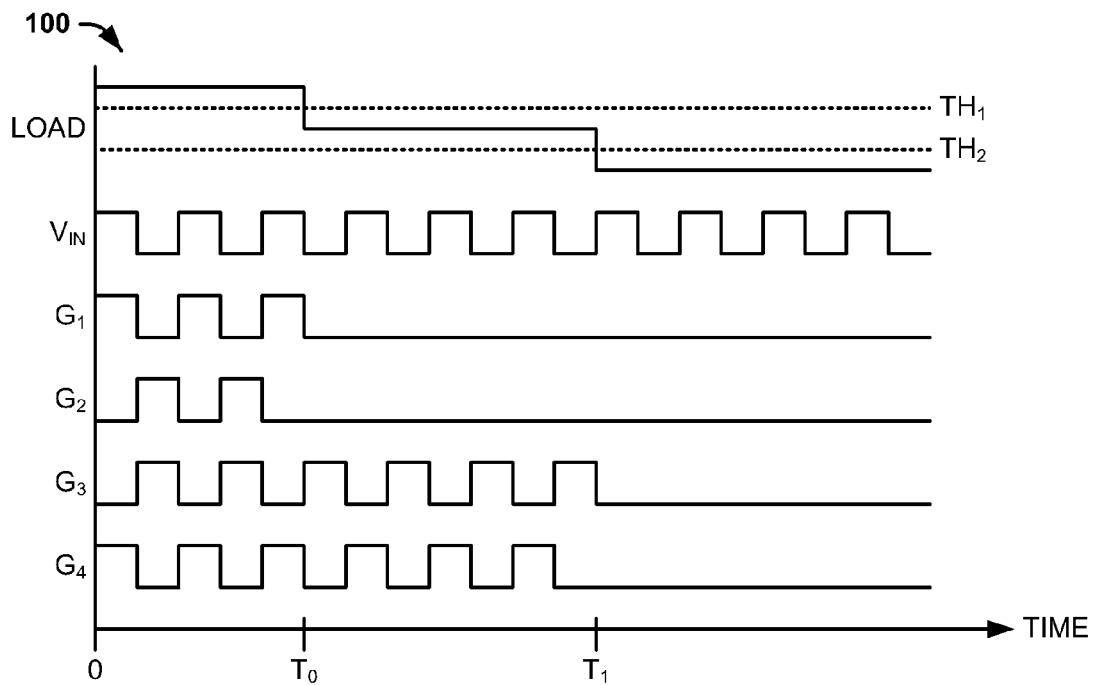
FIG. 3 illustrates an example of a timing diagram.

FIG. 3 illustrates an example of a timing diagram 100. The timing diagram 100 can be associated with operation of the power supply system 10 and/or the power converter 50 in the examples of FIGS. 1 and/or 2. Therefore, reference is to be made to the examples of FIGS. 1 and 2 in the following description of the example of FIG. 3.

The timing diagram 100 demonstrates the signal LOAD, the voltage $V_{IN}$, and the switching signals $G_1$ through $G_4$ plotted as a function of time. The voltage $V_{IN}$ across the primary winding $L_P$ of the transformer 54 oscillates in polarity between positive and negative values, thus changing the polarity of the voltage $1/n*V_{IN}$ across the secondary winding $L_S$ of the transformer. As a result, the output current $I_{OUT}$ changes direction through the secondary winding $L_S$ of the transformer 54, such that the output current $I_{OUT}$ switches between flowing through the switches $Q_2$ and $Q_3$ in the positive polarity of the voltage $V_{IN}$ and flowing through the switches $Q_1$ and $Q_4$ in the negative polarity of the voltage $V_{IN}$. Accordingly, in the normal operating mode, the switching signals $G_2$ and $G_3$ are asserted to activate the switches $Q_2$ and $Q_3$ in the negative polarity of the voltage $V_{IN}$ and the switching signals $G_1$ and $G_4$ are asserted to activate the switches $Q_1$ and $Q_4$ in the positive polarity of the voltage $V_{IN}$.

In the examples of FIGS. 1 and 3, the gate drive controller 16 receives a first threshold signal $TH_1$ and a second threshold signal $TH_2$ having a magnitude that is less than the first threshold signal $TH_1$. Therefore, the gate drive controller 16 is configured to compare the signal LOAD, generated by the load monitor 18 and thus indicative of the magnitude of the load, with the first and second threshold signals $TH_1$ and $TH_2$. As described herein, if the signal LOAD is less than the first threshold signal $TH_1$, the power supply system 10 is experiencing a light-load condition, such that the gate drive controller 16 can switch the power supply system 10 to a light-load operating mode.

From a time 0 to a time $T_0$, the signal LOAD is greater than the first threshold signal $TH_1$. Therefore, from the time 0 to the time $T_0$, the power supply system 10 is operating in the normal operating mode. As a result, the gate drive controller 16 is configured to activate the switches $Q_1$ and $Q_4$ alternately with the switches $Q_2$ and $Q_3$ to provide the current $I_{OUT}$ through the output inductor $L_1$. At the time $T_0$, the signal LOAD decreases less than the first threshold signal $TH_1$. Therefore, the power supply system 10 experiences a light-load condition, and thus switches to the light-load operating mode. In response, the gate drive controller 16 sets the switching signals $G_1$ and $G_2$ to an "off" state (e.g., approximately 0 volts) associated with the switches $Q_1$ and $Q_2$, respectively. Accordingly, the switches $Q_1$ and $Q_2$ are deactivated, thus forcing the output current $I_{OUT}$ to flow through the parallel-connected diodes $D_1$ and $D_2$ in the respective current loops instead of the respective switches $Q_1$ and $Q_2$. As a result, the voltages $V_1$ and $V_2$ increase based on the flow of the output current $I_{OUT}$ through the respective parallel-connected diodes $D_1$ and $D_2$. Accordingly, the voltage $V_L$ across the output inductor $L_1$ decreases based on Equations 1 and 2.

At a time $T_1$, the signal LOAD decreases further to a magnitude that is less than the second threshold signal $TH_2$. Thus, the power supply system 10 experiences a more severe light-load condition. In response, the gate drive controller 16 keeps the switching signals $G_1$ and $G_2$ in the "off" state, and further sets the switching signals $G_3$ and $G_4$ to the "off" state associated with the switches $Q_3$ and $Q_4$, respectively. Accordingly, all of the switches $Q_1$ through $Q_4$ are deactivated, thus forcing the output current $I_{OUT}$ to flow through the parallel-connected diodes $D_1$ through $D_4$ in the respective current loops instead of through the respective switches $Q_1$ through $Q_4$. As a result, the voltages $V_1$ and $V_2$ remain at the greater magnitude, and the voltages $V_3$ and $V_4$ likewise increase based on the flow of the output current $I_{OUT}$ through the respective parallel-connected diodes $D_1$ through $D_4$. Accordingly, the voltage $V_L$ across the output inductor $L_1$ decreases even further based on Equations 1 and 2. Accordingly, in the examples of FIGS. 2 and 3, the power supply system 10 can implement two stages of the light-load operating mode to mitigate the voltage $V_L$, and thus increases in the output voltage $V_{OUT}$, in a more flexible manner.

It is to be understood that the power converter 50 is not intended to be limited to the examples of FIGS. 2 and 3. For example, while the switching stage 56 is demonstrated in the example of FIG. 2 as a full-bridge rectifier, other switching stage topologies can be implemented instead. For example, the switching stage 56 can be configured as a two-switch rectifier in which the output inductor $L_1$ is coupled to a center of the secondary winding $L_S$ and the alternately activated switches are coupled to each respective end of the secondary winding $L_S$. As another example, the switching stage 56 can be configured as a two-switch free-wheeling rectifier stage in which each alternately activated switch is coupled to the output inductor $L_1$ and coupled to opposite ends of the secondary winding $L_S$. Furthermore, the power converter 50 could instead be implemented as a different type of power converter altogether, such as a buck, boost, or buck/boost converter, in which the switching stage 56 is instead configured as one or more switches that couple an input voltage to the output inductor $L_1$. Furthermore, the gate drive controller 16 is not limited to deactivating the switches $Q_1$ and $Q_2$ between the times $T_0$ and $T_1$, but could instead deactivate any combination of a single switch in each of the current loops in the first stage of the light-load operating mode. Accordingly, the techniques for controlling the voltage $V_L$ across the output inductor $L_1$ described herein can be applicable to any of a variety of DC/DC power converter topologies.

Figure 4:
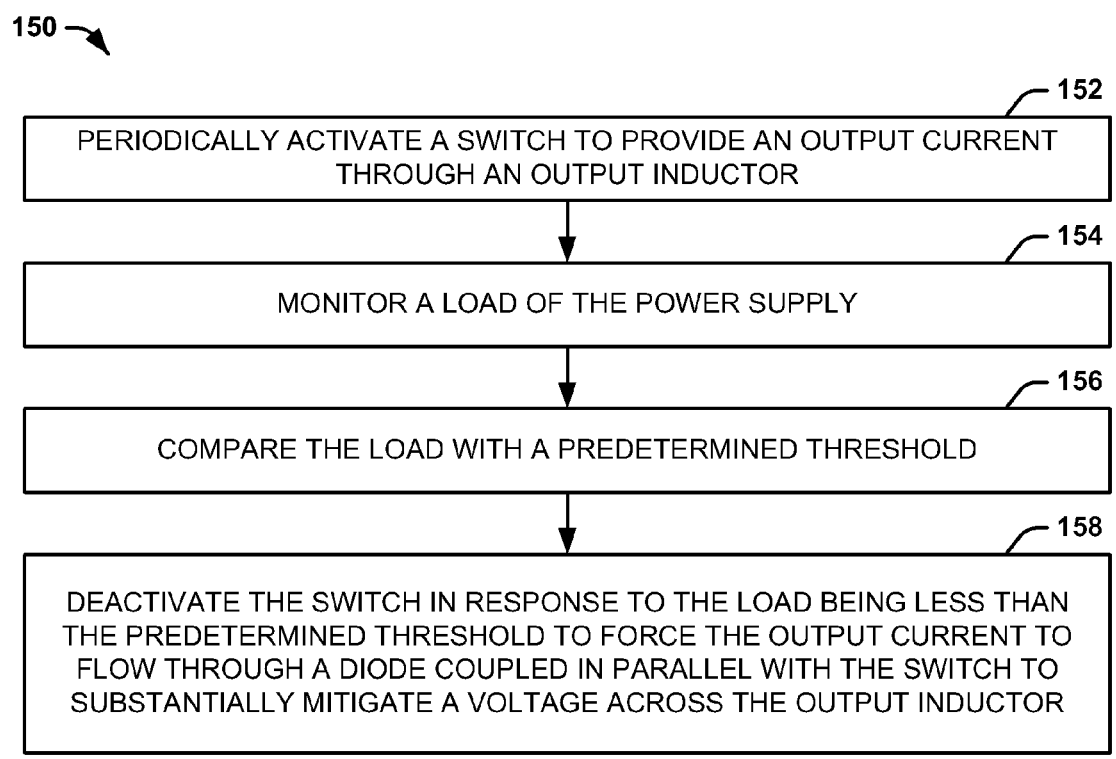
FIG. 4 illustrates an example of a method for regulating an output voltage of a power supply system.

In view of the foregoing structural and functional features described above, an example method will be better appreciated with reference to FIG. 4. While, for purposes of simplicity of explanation, the method of FIG. 4 is shown and described as executing serially, it is to be understood and appreciated that the method is not limited by the illustrated order, as parts of the method could occur in different orders and/or concurrently from that shown and described herein.

FIG. 4 illustrates an example of a method 150 for controlling a magnitude of an output current of a power supply system. At 152, a switch (e.g., in the switching stage 14 of FIG. 1) is periodically activated to provide an output current (e.g., the output current $I_{OUT}$ of FIG. 1) through an output inductor (e.g., the output inductor $L_1$ of FIG. 1). At 154, a load (e.g., the load $R_L$ of FIG. 1) of the power supply system (e.g., the power supply system 10 of FIG. 1) is monitored (e.g., by the load monitor 18 of FIG. 1). At 156, the load is compared with a predetermined threshold (e.g., the threshold signal TH of FIG. 1). At 158, the switch is deactivated in response to the load being less than the predetermined threshold to force the output current to flow through a diode (e.g., the diode(s) $D_1$ through $D_4$ of FIG. 2) coupled in parallel with the switch to substantially mitigate a voltage across the output inductor.

What have been described above are examples. It is, of course, not possible to describe every conceivable combination of components or methodologies, but one of ordinary skill in the art will recognize that many further combinations and permutations are possible. Accordingly, the invention is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A power supply system comprising:
a switching stage to provide an output current through an output inductor in response to a switching signal having a substantially fixed duty-cycle;
a load monitor to monitor a load of the power supply system; and
a gate drive controller to generate the switching signal and to change operation of the switching stage from a normal operating mode to a light-load operating mode in response to the load being less than a predetermined threshold to substantially-minimize a voltage across the output inductor in the light-load operating mode,
wherein the predetermined threshold comprises a first predetermined threshold and a second predetermined threshold, the second predetermined threshold being less than the first predetermined threshold, and
wherein the gate drive controller is to change operation of the switching stage to decrease the voltage across the output inductor by a first magnitude in response to the load being less than the first predetermined threshold and to decrease the voltage across the output inductor by a second magnitude in response to the load being less than the second predetermined threshold.

2. The system of claim 1, wherein the switching stage comprises a switch and a parallel-coupled diode,
wherein the switch is to be activated during an on-time of a duty-cycle of the switching signal in the normal operating mode to provide the output current through the output inductor, and
wherein the gate drive controller is to deactivate the switch in the light-load operating mode to force the output current to flow through the parallel-coupled diode.

3. The system of claim 1, wherein the switching stage comprises a first switch and an associated first parallel-coupled diode and a second switch and an associated second parallel-coupled diode,
wherein the first switch and the second switches are to be activated during an on-time associated with respective first and second switching signals in the normal operating mode to provide the output current through the output inductor, and
wherein the gate drive controller is to deactivate the first switch in response to the load being less than the first predetermined threshold to force the output current to flow through the first parallel-coupled diode and to deactivate the first and second switches in response to the load being less than the second predetermined threshold to force the output current to flow through the first and second parallel-coupled diodes.

4. The system of claim 1, wherein the switching signal is to be provided by the gate drive controller with a substantially fixed duty-cycle in the normal operating mode and is to be provided at a substantially constant deactivation state in the light-load operating mode.

5. The system of claim 4, wherein the switching stage is arranged as a rectifier comprising a plurality of switches, and wherein the substantially fixed-duty cycle is a substantially maximum non-overlapping duty-cycle with respect to alternate activation of the plurality of switches.

6. The system of claim 1, wherein the switching stage is arranged as a full-bridge rectification stage comprising two pairs of alternately activated switches and a parallel-coupled diode associated with each of the switches.

7. The system of claim 6, wherein the gate drive controller is to operate the two pairs of alternately activated switches substantially identically in each of a normal operating mode and a light-load operating mode to substantially minimize the voltage across the output inductor in the light-load operating mode.

8. A power supply system comprising:
a switching stage comprising a first switch and an associated first parallel-coupled diode and a second switch and an associated second parallel-coupled diode;
a load monitor to monitor a load of the power supply system; and
a gate drive controller to generate a first switching signal and a second switching signal that each have a substantially fixed-duty-cycle,
wherein the first and second switching signals are to concurrently activate the respective first and second switches to provide an output current through an output inductor, and
wherein the gate drive controller being further to deactivate the first switch in response to the load being less than a first predetermined threshold to force the output current to flow through the first parallel-coupled diode and to deactivate the first and second switches in response to the load being less than a second predetermined threshold that is less than the first predetermined threshold to force the output current to flow through the first and second parallel-coupled diodes.

9. The system of claim 8, wherein the switching stage is arranged as a full-bridge rectification stage.

10. The system of claim 9, wherein the full-bridge rectification stage comprises a third switch and an associated third parallel-coupled diode and a fourth switch and an associated fourth parallel-coupled diode, and
wherein the gate drive controller is further to activate the third switch substantially concurrently with the first switch via a third switching signal and to activate the fourth switch substantially concurrently with the second switch via a fourth switching signal, the third and fourth switching signals each having a substantially fixed duty-cycle.

11. The system of claim 10, wherein the gate drive controller is to deactivate the third switch in response to the load being less than the first predetermined threshold to force the output current to flow through the third parallel-coupled diode and to deactivate the third and fourth switches in response to the load being less than the second predetermined threshold to force the output current to flow through the first and second parallel-coupled diodes.

12. The power supply system of claim 8, wherein the gate drive controller is to deactivate a first pair of switches in response to a load monitor signal load being less than the first predetermined threshold, and to deactivate both the first pair of switches and a second pair of switches in response to the load monitor signal load being less than the second predetermined threshold.

13. The power supply system of claim 12, wherein the first pair of switches includes the first switch and the second pair of switches includes the second switch.

14. A method for regulating an output voltage of a power supply system, the method comprising:
- periodically activating a first switch with a first switching signal to provide an output current through an output inductor;
- monitoring a load of the power supply system;
- comparing the load with a predetermined threshold;
- deactivating the first switch in response to the load being less than a first predetermined threshold to force the output current to flow through a diode coupled in parallel with the first switch to substantially mitigate a voltage across the output inductor;
- periodically activating a second switch with a second switching signal concurrently with the first switch to provide the output current through the output inductor;
- deactivating the first switch in response to the load being less than the first predetermined threshold; and
- deactivating the first switch and the second switch in response to the load being less than a second predetermined threshold that is less than the first predetermined threshold.

15. The method of claim 14, wherein periodically activating the first and second switches comprises periodically activating the first and second switches based on respective switching signals having a substantially fixed duty-cycle, and
- wherein deactivating the first and second switches comprises maintaining the respective switching signals at a deactivation state.

16. The power supply system of claim 1, wherein the gate drive controller is to deactivate a first pair of switches in response to a load monitor signal load being less than the first predetermined threshold, and to deactivate both the first pair of switches and a second pair of switches in response to the load monitor signal load being less than the second predetermined threshold.

17. The power supply of claim 1, wherein the switching stage is arranged as a full-bridge rectification stage comprising a first switch and an associated first parallel-coupled diode, a second switch and an associated second parallel-coupled diode, a third switch and an associated third parallel-coupled diode, and a fourth switch and an associated fourth parallel-coupled diode, and
- wherein the gate drive controller is to activate the third switch substantially concurrently with the first switch via a corresponding switching signal and to activate the fourth switch substantially concurrently with the second switch via a corresponding switching signal.

18. The method of claim 14, wherein the first switch is deactivated along with a third switch in response to a load monitor signal load being less than the first predetermined threshold, and
- wherein the second switch is deactivated along with a fourth switch in response to a load monitor signal load being less than the second predetermined threshold.

19. The method of claim 14, wherein the switching stage is arranged as a full-bridge rectification stage comprising a third switch and an associated third parallel-coupled diode and a fourth switch and an associated fourth parallel-coupled diode, the method further comprising:
- periodically activating the third switch substantially concurrently with the first switch via a third switching signal; and
- periodically activating the fourth switch substantially concurrently with the second switch via a fourth switching signal, the third and fourth switching signals each having a substantially fixed duty-cycle.

20. The method of claim 14, wherein deactivating the second switch forces the output current to flow through a diode coupled in parallel with the second switch to further substantially mitigate a voltage across the output inductor.

* * * * *